United States Patent

Pedersen

[19]

[11] Patent Number: 6,072,291

[45] Date of Patent: Jun. 6, 2000

[54] FREQUENCY CONVERTER FOR AN ELECTROMOTOR

[75] Inventor: Arne Lhjungmann Pedersen, Nordborg, Denmark

[73] Assignee: Danfoss A/S, Nordborg, Denmark

[21] Appl. No.: 09/142,952

[22] PCT Filed: Mar. 20, 1997

[86] PCT No.: PCT/DK97/00121

§ 371 Date: Jan. 8, 1999

§ 102(e) Date: Jan. 8, 1999

[87] PCT Pub. No.: WO97/36368

PCT Pub. Date: Oct. 2, 1997

[30] Foreign Application Priority Data

Mar. 22, 1996 [DE] Germany .......................... 196 11 401

[51] Int. Cl.[7] ...................................................... H02K 7/10
[52] U.S. Cl. ......................... 318/362; 318/727; 318/812; 318/376; 363/20; 363/16

[58] Field of Search ..................................... 318/362, 727, 318/812, 376; 363/20, 16, 17, 35

[56] References Cited

U.S. PATENT DOCUMENTS

| | | | |
|---|---|---|---|
| 4,688,164 | 8/1987 | Rilly | 363/98 |
| 5,623,397 | 4/1997 | Vinciarelli | 363/20 |
| 5,712,771 | 1/1998 | Fitter et al. | 363/17 |

*Primary Examiner*—Karen Masih
*Attorney, Agent, or Firm*—Lee, Mann, Smith, McWilliams, Sweeney & Ohlson

[57] ABSTRACT

The invention concerns a frequency converter for an electromotor with an intermediary circuit, in which a braking circuit with a switch and a load is arranged. With such a frequency converter, it is possible to ease the demands on protection measures, even though the load is placed outside the frequency converter. For this purpose the load is galvanically separated from the intermediary circuit.

9 Claims, 1 Drawing Sheet

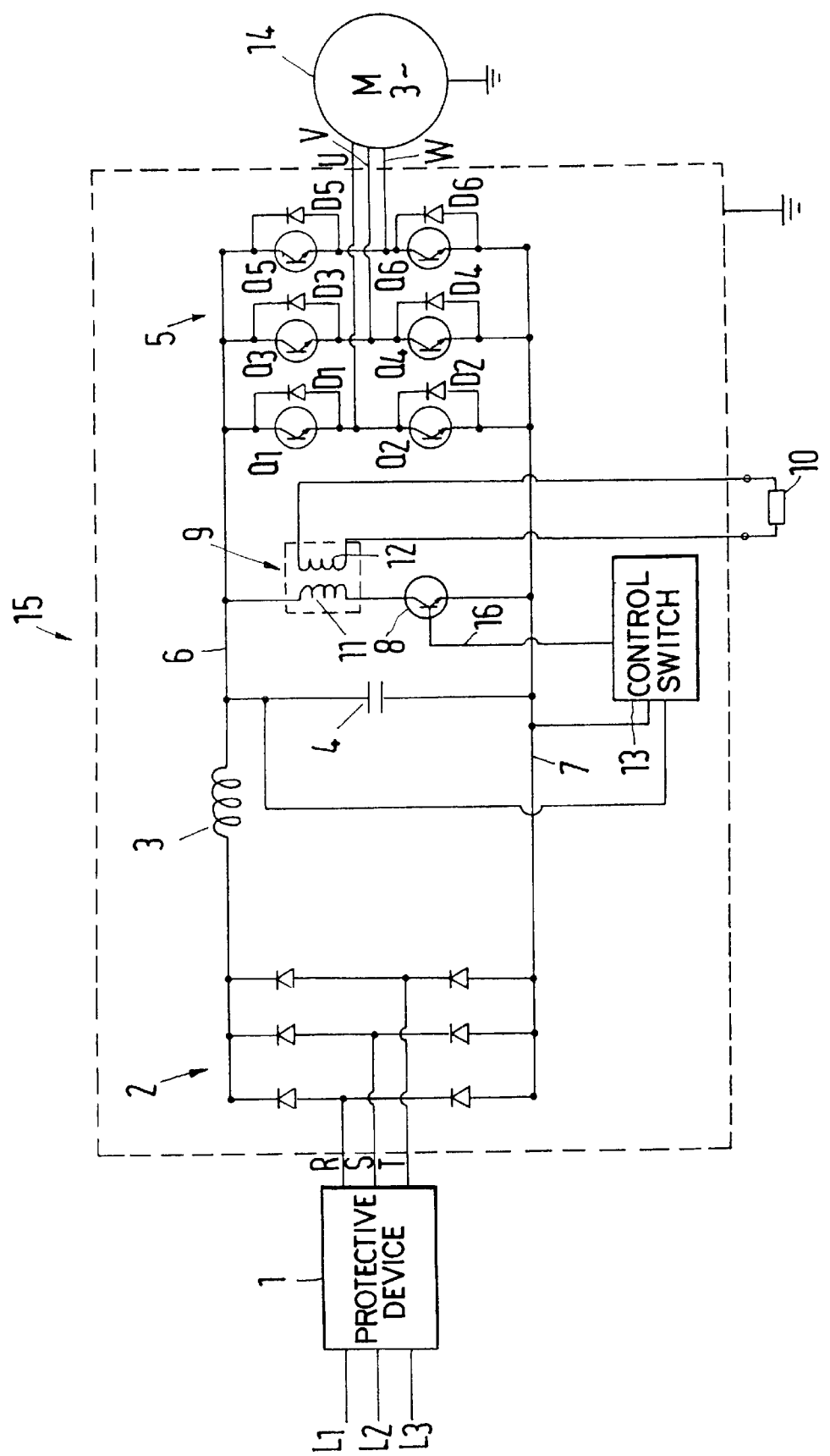

FREQUENCY CONVERTER FOR AN ELECTROMOTOR

BACKGROUND OF THE INVENTION

The invention concerns a frequency converter for an electromotor with an intermediary circuit, in which a braking circuit with a switch and a load is arranged.

Frequency converters normally consist of a rectifier rectifying a one- or multi-phase AC-voltage and supplying it to an intermediary circuit. Alternatively, the intermediary circuit can also be supplied from a different DC source. The intermediary circuit supplies an inverter, which again supplies the connected motor with a voltage with the desired frequency. When an interruption of the motor operation is desired, the voltage/frequency relation is reduced, so that the current changes its direction. Now the frequency converter no longer supplies current. In this case the motor acts as a generator supplying power back to the frequency converter, as the terminal voltage in the motor is higher than that in the inverter. For the braking of the motor the electrical energy fed back is often led through a load, by which the supply of electrical energy to the load is controlled by a switch, also called a braking chopper. Loads can be defined as all sorts of devices converting electrical energy into different energy forms, such as heat.

Such a frequency converter is known from for instance U.S. Pat. No. 5,420,491. Here, the load is an ohmic resistor.

For motors with high inertia torques the amount of energy fed back to the frequency converter is often relatively high. Then the load can no longer in all cases be arranged inside the housing of the frequency converter, meaning that it has to be arranged outside the housing. In this case, for instance, the cooling is better. Also, other sorts of energy conversion of electrical energy into other types of energy are easier to realise. However, arranging the load outside the frequency converter bears the disadvantage that the load is exposed to the environmental conditions. Thus, humidity and mechanical or electromechanical conditions may influence the load, which may lead to electrical failures, such as earth faults or short-circuits.

For this reason, several countries prescribe that such electronic devices must be provided with a protective device, as for instance a fault-current protective switch (earth leakage breaker=FI-switch).

Such FI-switches are different, depending on the demands they have to meet. Thus, the IEC 755, chapter 4.2.10, for instance, distinguishes between type A switches and type B switches. The type B switches can, for example, detect a direct current component in the earth leakage current, which is the case when for instance an earth fault occurs in the load, which is connected to a DC intermediary circuit. This results in a current flow comprising a direct current component. Such direct current components cannot be detected by type A FI-switches.

However, a type B FI-switch is relatively expensive, and bears the disadvantage that the installation is complicated and expensive too. Besides, the connection of other FI-switches before type B FI-switches is not permitted.

Thus, it is the purpose of the invention to reduce the demands on protective measures in connection with a frequency converter.

SUMMARY OF THE INVENTION

With a frequency converter of the type described in the introduction, this task is solved in that the load is galvanically separated from the intermediary circuit.

This prevents a direct current component from flowing through the load. Thus it is no longer necessary to mount the expensive type B FI-switch. The less expensive type A FI-switch can be used. All direct current components remain inside the frequency converter. They must no longer be separately protected, as is the case for currents and voltages reaching the outside, especially the load.

Preferably, the braking circuit comprises a four-port network for this purpose, the output of which is connected with the load, and the input of which is connected with the intermediary circuit, whereby the four-pole network only passes on electrical sizes changing in time to its output. Thus, the four-port network forms a DC barrier. Only alternating currents are transferred to the output. Consequently, direct currents, making expensive fuse protection necessary, cannot occur in the load. As mentioned above, the protection of alternating currents with respect to earth fault can be made in a less expensive way.

Advantageously, the input of the four-port network lies in series with the switch. Thus, the input side of the four-port network is controlled. When the series connection is interrupted through an opening of the switch, no idling currents can occur, which is especially important for the normal operation of the frequency converter.

Preferably, the four-port network is made as a transformer. In a transformer as used here, the primary winding and the secondary winding are galvanically separated. In spite of that, alternating currents can be transferred to the load with relatively low losses. However, the direct current component is kept away from the load in a reliable way.

In this connection it is preferred that the output voltage of the transformer is lower than the input voltage. The load can thus be operated with a lower voltage but with a higher current. This also reduces the demands on the protective precautions.

Preferably, the braking circuit is arranged between a plus and a minus cable of the intermediary circuit. This enables a quick and reliable reduction of a voltage increase caused by the energy fed back from the motor.

Preferably, the switch is made as an electronic switch with a control connection. For this purpose, for example transistors or other semi-conductor components can be used. With such electronic switches it is possible to reach relatively high switching frequencies, causing that the dimensions of the transformer can be correspondingly reduced. Besides, they can be controlled according to known methods.

Preferably, the load is made as an ohmic resistor. This is the simplest way of converting the electric energy fed back to the frequency converter from the motor to a different energy form, namely heat.

BRIEF DESCRIPTION OF THE DRAWING

In the following the invention is described on the basis of a preferred embodiment in connection with the drawing, by which the only drawing shows:

A schematic diagram of a frequency converter.

DESCRIPTION OF THE PREFERRED EMBODIMENT

A frequency converter 15 comprises a three-phase input R, S, T, which is connected to a three-phase electric supply represented by three cables L1, L2, L3, via a fault-current protective device 1.

On its input the frequency converter 15 has a three-phase rectifier 2, rectifying the current from the mains L1, L2, L3 and supplying it to an intermediary circuit, which, in this embodiment, comprises an LC-Filter having an inductance 3 and a capacity 4. The LC-Filter serves the purpose of equalising the DC voltage supplied by the rectifier 2. The DC voltage is led to an inverter 5 through a plus cable 6 and a minus cable 7. The inverter 5 is designed with three phases, and through its three-phase output U, V, W it supplies an electric motor 14, e.g. an asynchronous machine with energy. For this purpose, each phase of the inverter 5 has two transistors Q1 to Q6, an idling diode D1 to D6 being connected in parallel with each transistor. In a way that is not shown in detail, but commonly known, the inverter 5 is provided with a controller switching the transistors Q1 to Q6 in a way that on the output U, V, W the supply voltage for the motor 14 is available with the desired frequency.

When the motor 14 is to be stopped, all transistors Q1 to Q6 are off, or the voltage/frequency relation is regulated down for a faster braking, so that the direction of the current changes. Then the motor 14 acts as a generator supplying the electric power back to the frequency converter. By this the electric current reaches the intermediary circuit via the diodes D1 to D6 resulting in a voltage increase between the plus cable 6 and the minus cable 7. To keep the voltage increase below a pre-set maximum value, but primarily to accelerate the braking of the motor 14, a braking circuit is provided in the intermediary circuit between the plus cable 6 and the minus cable 7.

The braking circuit comprises a four-port network in the form of a transformer 9. Hereby, a primary winding 11 of the transformer 9 forms the input of the four-port network. The secondary winding 12 of the transformer 9 forms the output of the four-port network. A load in the form of an ohmic resistor 10 is connected to the secondary winding 12. As shown schematically, the resistor 10 is arranged outside the frequency converter 15. Thus the size and the performance of the resistor 10 are no longer limited by the size and the environmental conditions inside the frequency converter 15, or rather inside the housing of the frequency converter 15. This means that larger amounts of electric energy can be dissipated, i.e. transformed to heat, in the resistor 10, without risking that the frequency converter 15 itself is thermally endangered. Also other loads can be foreseen, which transfer electric energy in other ways, which can however not be arranged inside the housing of the frequency converter 15, for instance a flywheel with driver or an electrode device in the galvanic field.

The primary winding 11 of the transformer 9 lies in series with a switch transistor 8, which is controlled by a control switch 13 via a control connection 16. The control switch 13 measures the voltage between the plus cable 6 and the minus cable 7. It can control the transistor 8 in dependence on this voltage, which can for instance be measured on the capacitor 4.

The transistor 8, which can also be called braking chopper, closes or opens a current path from the plus cable 6 to the minus cable 7 through the primary winding 11 of the transformer 9. By way of the duty cycle, i.e. the relation between the closing times of the transistor and the sum of the opening and closing times, a precise and controlled voltage reduction in the intermediary circuit between the cables 6, 7 can be obtained. When the transistor 8 is closed, the current can flow from the plus cable 6 to the minus cable 7, by which this current also flows through the primary winding 11 of the transformer 9. As this current is not constant, but increases and decreases over the time in dependence on the opening and closing of the transistor 8, a current is induced in the secondary winding 12 of the transformer 9. This current is a pure alternating current without direct current components, and is transformed to heat in the resistor 10. Thus the energy is removed from the intermediary circuit.

If, during normal operation, an earth fault should occur in the resistor 10, this has no negative influences, as on the primary side of the transformer only DC voltage is available, which cannot be transferred to the resistor 10. The same applies for the braking operation. Also here a direct current cannot be transferred to the resistor 10, meaning that the fault-current protective device can be made in a correspondingly less expensive way. For example, a type A Fi-switch can be used in stead of a type B FI-switch.

Additionally, the transformer 9 can be used for a voltage transformation. When making the output voltage of the transformer smaller than the input voltage, for instance through a proper relation between the winding numbers of the primary winding 11 and the secondary winding 12, a lower voltage appears over the load 10. True enough, this is connected with a higher current, but it also reduces the demands on protective precautions.

In stead of the pictured transformer 9 with a secondary winding 12, which is galvanically separated from the primary winding 11, other transformers can of course also be used, which have a galvanic separation between the primary side and the secondary side and transfer the electric energy from the primary side to the secondary side by means of electrical, magnetic or other fields.

What is claimed is:

1. Frequency converter for an eletromotor having an intermediary circuit, the intermediary circuit including a braking circuit having a switch and a load, the load being galvanically separated from the intermediary circuit, and the braking circuit being connected between positive and negative cables of the intermediary circuit.

2. Frequency converter according to claim 1, in which the braking circuit includes a four-port network having an output connected with the intermediary circuit, whereby the four-port network only passes on electrical variations changing in time to the output.

3. Frequency converter according to claim 2, in which the input is connected in series with the switch.

4. Frequency converter according to claim 2, in which the four-port network comprises a transformer.

5. Frequency converter according to claim 4, in which output voltage of the transformer is lower than input voltage.

6. Frequency converter according to claim 1, in which the switch comprises an electronic switch with a control connection.

7. Frequency converter according to claim 6, in which the control connection is connected to a control switch.

8. Frequency converter according to claim 6, in which the braking circuit includes a transformer, the electronic switch being connected to an input of the transformer and the load being connected to the output of the transformer.

9. Frequency converter according to claim 1, in which the load is an ohmic resistor.

* * * * *